United States Patent [19]
Maxfield et al.

[11] Patent Number: 5,385,776
[45] Date of Patent: Jan. 31, 1995

[54] NANOCOMPOSITES OF GAMMA PHASE POLYMERS CONTAINING INORGANIC PARTICULATE MATERIAL

[75] Inventors: MacRae Maxfield, Plainfield; Brian R. Christiani, Maplewood; Sanjeeva N. Murthy, Neshanic Station; Harold Tuller, Long Valley, all of N.J.

[73] Assignee: AlliedSignal Inc., Morris Township, Morris County

[21] Appl. No.: 976,600

[22] Filed: Nov. 16, 1992

[51] Int. Cl.$^6$ .............. B32B 5/06; B32B 5/22
[52] U.S. Cl. .................. 428/297; 428/303; 428/331; 428/372; 428/374; 428/475.5; 428/477.7; 524/789
[58] Field of Search ........... 428/297, 303, 373, 475.5, 428/331, 372, 374, 477.7; 524/789

[56] References Cited

U.S. PATENT DOCUMENTS

| | | | |
|---|---|---|---|
| 4,290,935 | 9/1981 | Muraki et al. | 528/323 X |
| 4,379,979 | 8/1983 | Reimschuessel | 524/413 |
| 4,739,007 | 4/1988 | Okada et al. | 524/789 |
| 4,810,734 | 3/1989 | Kawasumi et al. | 523/216 |
| 4,894,411 | 1/1990 | Okada et al. | 524/710 |
| 5,102,948 | 4/1992 | Deguchi et al. | 524/789 |

FOREIGN PATENT DOCUMENTS

| | | |
|---|---|---|
| 0398551 | 11/1990 | European Pat. Off. |
| 3632865 | 4/1987 | Germany |
| 109998 | 3/1975 | Japan |
| 55-149346 | 11/1980 | Japan |
| 2029458 | 1/1990 | Japan |

OTHER PUBLICATIONS

Murthy, N. S., "Metastable Crystalline Phases in Nylon 6", *Polymer Communications*, vol. 32, No. 1, (1991), pp. 301–305.

*A New Dictionary of Chemistry*–Miall & Sharp–4th Edition–p. 614.

*Primary Examiner*—Paul J. Thibodeau
*Assistant Examiner*—H. Thi Le
*Attorney, Agent, or Firm*—Melanie L. Brown; Roger H. Criss

[57] ABSTRACT

This invention is directed to a composite formed from a gamma phase polyamide such as nylon 6 having dispersed therein a particulate material such as a phyllosilicate as for example montmorillonite.

18 Claims, No Drawings

NANOCOMPOSITES OF GAMMA PHASE POLYMERS CONTAINING INORGANIC PARTICULATE MATERIAL

BACKGROUND OF INVENTION

1. Field of the Invention

This invention relates to a composite material comprising a polymer matrix having dispersed therein anisotropic nanometer size particles such as organophilic platelet particles derived from swellable intercalated layered materials and inorganic fibrillar materials, and to articles of manufacture formed from the composite material of this invention. More particularly, this invention relates to such composite materials and composites where polymer matrix is formed of a polymer in the gamma phase.

2. Prior Art

Polyamides may exist in various crystalline forms. Two principal crystalline forms of nylon 6, alpha and gamma, have been characterized structurally and thermodynamically (see, for example, Polymer Communications, 1991, 301 and references cited therein).

Various additives have been used to modify Nylon 6 which increases the rate of crystallization to the alpha or gamma form. See, for example, U.S. Pat. Nos. 4,397,979 and 4,290,935 and Japanese Patent 55-149346).

Polyamides, such as nylon 6, comprising a dispersion of particles, derived from organophilic phylosilicates and having a thickness of about 5 Å to about 12 Å, have been reported in the literature. See for example U.S. Pat. Nos. 4,739,007 and 4,810,734, and Kokai Publication No. 109998/76.

SUMMARY OF THE INVENTION

This invention relates to a composite comprising a polymer matrix comprising at least one gamma phase polyamide wherein at least about one weight percent of said polyamide based on the total moles of said polyamide is in the gamma phase, said polymer matrix having dispersed therein up to less than about 0.5% by wt. of the matrix of a nanometer-scale particulate material selected from the group consisting of layered material having a thickness equal to or less than about 200 Å and fibrillar materials having a diameter equal to or less than about 100 Å. Another aspect of this invention relates to an article of manufacture comprising a body all or a portion of which is formed of the composite of this invention.

The composite of this invention exhibits several beneficial properties. For example, in the composite that portion of the polymer in the gamma phase crystalline form is resistant to conversion to the alpha crystalline form. Moreover, in those instances where the gamma phase polymer is a polyamide such as Poly(epsilon-caprolactam)(nylon 6), the composition exhibits improved rigidity and water resistance strength (ASTM D638 and ASTM D790), while substantially retaining other properties such as toughness (ASTM D256), surface gloss (ASTM D0523) and abrasion resistance (ASTM D1044).

DESCRIPTION OF THE PREFERRED EMBODIMENTS

The composite of this invention includes two essential components. One essential component is a polymer matrix comprising a gamma phase polyamide where at least about 1 weight percent of said polyamide is in the gamma crystalline phase. As used herein a "gamma phase polyamide" is a semi-crystalline polyamide capable of forming two or more crystalline phases, and comprising at least one of the less stable crystalline phases as determined by x-ray diffraction (XRD), infrared spectroscopy (IR), differential scanning calorimetry (DSC) and nuclear magnetic resonance (NMR), as described in N. S. Murthy and H. Minor, Polymer, 31,pp. 996–1002 (1990). For example, nylon 6 is a gamma phase polyamide capable of forming two crystalline forms. The nylon 6 chain has a directionality so that adjacent chain segments in a crystalline phase can either be parallel or anti-parallel. In the more stable alpha phase, hydrogen bonds form between anti-parallel chain segments, while in the less stable gamma phase, hydrogen bonds form between parallel segments. By contrast, nylon 6,6 is not a gamma phase polymer and is capable of forming a single crystalline phase since its chain has no directionality.

Polyamides for use in the process of this invention may vary widely, the only requirement is that they are capable of gamma phase crystallinity and are preferably melt processible. As used herein, a "polyamide" is a substance composed of ten or more recurring carbonamide monomeric units which may be the same or different. In the preferred embodiments of the invention, the polyamide includes at least thirty recurring monomeric units. The upper limit to the number of recurring monomeric units is not critical, provided that the melt index of the polymer under use conditions is such that the polymamide forms a composite material which can be processed into articles of this invention. More preferably, the polyamide includes at least from about 30 to about 100 recurring monomeric units. In the most preferred embodiments of this invention, the number of recurring units is such that the polyamide has a melt index of from about 0.01 to about 12 grams per 10 minutes, preferably from about 0.01 to about 10 grams/10 minutes and more preferably from about 0.5 to about 10 grams/10 minutes as measured by ASTM Test No. D-1238 at a load of 1000 grams at the processing temperature.

Illustrative of useful polyamides capable of gamma phase crystallinity are those formed from the polymerization of amino acids and derivatives thereof as for example lactams. Such polyamides include nylon 4, nylon 9, nylon 11, nylon 6, nylon 12, nylon 8, nylon 10, nylon 18 and the like. Preferred gamma phase polyamides are those formed by reaction of amino acids or derivatives thereof such as lactams. More preferred gamma phase polyamides are nylon 11, nylon 6 and nylon 12, and most preferred are nylon 6 and nylon 12. Nylon 6 is the gamma phase polymer of choice, especially where the nylon 6 has a melt index from about 0.01 to about 10 grams/10 minutes, and preferably from about 0.5 to about 10 grams/10 minutes as measured by ASTM Test No. D-1238 at a load of 1000 grams at 235° C.

The fraction of the polyamide having gamma phase crystallinity may vary widely. In general, the amount of the polyamide in the gamma phase is at least about 1 weight % based on the total weight of the polyamide. The amount of polyamide having gamma phase crystallinity is preferably at least about 10 weight % more, preferably from about 10 to about 50 weight % of the polyamide and most preferably from about 20 to about 50 weight % on the aforementioned basis. In the embodiments of choice, the amount of polyamide in the gamma phase is from about 30 to about 50 weight percent based on the total weight of the polyamide.

As a second essential ingredient, the composite of this invention includes dispersed particles selected from the group consisting of layered and fibrillar inorganic materials. Useful inorganic fibrillar materials may vary widely and are those having average diameters equal to or less than about 100 Å with a maximum diameter of 200 Å, preferably from about 10 to about 100 Å with a maximum diameter of 200 Å, more preferably from about 10 to about 50 Å with a maximum diameter of 100 Å, and most preferably from about 10 to about 20 Å with a maximum diameter of 50 Å. The average length of useful fibrillar materials may vary widely and is usually equal to or less than about 2,000 Å with a maximum length of about 10,000 Å, preferably from about 200 to about 2,000 Å with a maximum length of about 5,000 Å, more preferably from about 300 to about 2,000 Å with a maximum length of 2000 Å and most preferably from about 400 to about 1,000 Å with a maximum length of about 2,000 Å. Illustrative of useful fibrillar materials are imogolite and vanadium oxide.

Useful layered materials are those in which layers have an average thickness equal to or less than about 25 Å with a maximum thickness of 100 Å, preferably from about 5 Å to about 25 Å with a maximum thickness of 75 Å, more preferably from about 5 Å to about 20 Å with a maximum thickness of 50 Å, and more preferably from about 7 Å to about 25 Å with a maximum thickness of 25 Å.

Layered materials for use in this invention may vary widely and include phyllosilicates. Illustrative of such materials are smectite clay minerals such as montmorillonite, nontronite, beidellite, volkonskoite, hectorite, saponite, sauconite, magadiite, and kenyaite; vermiculite; and the like. Other useful layered materials include illite minerals such as ledikite and admixtures of illites with the clay minerals named above. Other useful layered materials, particularly useful with anionic polymers, are the layered double hydroxides, such as $Mg_6Al_{3.4}(OH)_{18.8}(CO_3)_{1.7}H_2O$ (see W. T. Reichle, J. Catal., 94 (12985) 547), which have positively charged layers and exchangeable anions in the interlayer spaces. Other layered materials having little or no charge on the layers may be useful in this invention provided they can be intercalated with swelling agents which expand their interlayer spacing. Such materials include chlorides such as $FeCl_3$ and $FeOCl$, chalcogenides such as $TiS_2$, $MoS_2$, and $MoS_3$, cyanides such as $Ni(CN)_2$, and oxides such as $H_2Si_2O_5$, $V_6O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$—$2H_2O$, $CaPO_4CH_3$—$H_2O$, $MnHAsO_4$—$H_2O$, $Ag_6Mo_{10}O_{33}$, and the like. Preferred swellable layered materials are phyllosilicates of the 2:1 type having a negative charge on the layers ranging from about 0.25 to about 0.9 charges per formula unit and a commensurate number of exchangeable cations in the interlayer spaces. Most preferred layered materials are smectite clay minerals such as montmorillonite, nontronite, beidellite, bolkonskoite, hectorite, saponite, sauconite, magadiite, and kenyaite.

The amount of layered or fibrillar material included in the composite material, that is sufficient to result in a significant increase in the gamma content of a gamma phase polymer, is as little as about 5 ppm by weight.

The amount of layered and fibrillar material included in the composite material may vary widely depending on the intended use of the composite provided that the amount is less than about 0.5% by weight of the matrix. The lower amount is not critical provided that the amount is sufficient to provide the advantages of this invention. For example, the amount of such materials may be as low as about 5 ppm. Preferably the amount of layered or fibrillar material included is equal to or greater than about 10 ppm, more preferably equal to or greater than about 20 ppm and equal to or less than about 0.4% by weight, and most preferably equal to or greater than about 100 ppm and equal to or less than about 0.3% by weight.

The layered and fibrillar materials are substantially homogeneously dispersed in the gamma phase polymer matrix. In the case of layered materials, the layered material is dispersed as platelet particles. As used herein, "platelet particles" are particles having two relatively flat opposite faces wherein the thickness of which is the distance between the faces, which is relatively small compared to the size of the faces. The platelet particles dispersed in matrix polymers may have the thickness of the individual layers, or small multiples less than about 10, preferably less than about 5 and more preferably less than about 3 of the layers, and still more preferably 1 or 2 layers. The other dimensions of the platelet particles may vary greatly, but in the case of particles derived from clay minerals, the particle faces are roughly round or oblong having average diameters between about 10,000 Å and about 50 Å, such that the aspect ratio length/thickness ranges from about 1000 to about 1. For the purposes of the present invention, the average diameter is defined as the diameter of a circle having an area equal to the surface area of one broad surface face of the platelet shaped particle. The average diameter is determined from particle surface area as measured with a Leitz Texture Analyzer System in a fully computerized and automated mode. In the preferred embodiments of the invention, the average thickness of the platelet particles is equal to or less than about 20 Å with a maximum thickness of 50 Å and the average diameter is between 5,000 Å and 100 Å with a maximum diameter of 10,000 Å. More preferably, the average thickness is equal to or less about 15 Å with a maximum thickness of 25 Å and the average diameter is from about 2,000 Å to about 200 Å with a maximum diameter of 5,000 Å. Most preferably, the average thickness is from about 5 to about 15 Å with a maximum thickness of 25 Å and the average diameter is from about 2000 Å to about 200 Å with a maximum diameter of 5,000 Å.

The average interparticle spacing between layers of the layered materials and fibrils of the fibrillar materials may vary widely depending on the concentration of materials. In general, the higher the concentration of material in the polymer matrix the smaller the interparticle spacing; and conversely, the lower the concentration of material, the larger the interparticle spacing. In general, interparticle spacing is equal to or greater than about 15 Å to about 40 microns. The interparticle spacing is preferably equal to or greater than about 30 Å to about 20 microns, more preferably equal to greater than about 50 Å to about 5 microns, and most preferably equal to or greater than about 100 Å to about 1 micron.

As used herein "uniformly dispersed" is defined as a degree of dispersion of the particles having a standard deviation in particle density, down to a sampling volume of $10^{-15}m^3$ as determined by transmission electron microscopy. The degree of dispersion is preferably less than about 50% of the mean, more preferably less than about 30% of the mean, and most preferably less than about 20% of the mean.

The composite material of this invention may include various optional components which are additives commonly employed with polyamides. Such optional components include nucleating agents, fillers, plasticizers, impact modifiers, chain extenders, plasticizers, colorants, uv stabilizers, thermal stabilizers, mold release lubricants, antistatic agents, pigments, fire retardants, and the like. These optional components and appropriate amounts are well known to those of skill in the art, accordingly, only the preferred optional components will be described herein in detail.

The composite of this invention can be formed by any suitable process for forming the composite of this invention. For example, the composite of this invention can be conveniently prepared by in-reactor blending processes of the type described in U.S. Pat. Nos. 4,739,007 and 4,810,734 in which a monomer precursor of the polyamide such as a lactam is polymerized using some suitable techniques as for example, condensation polymerization, anionic polymerization, hydrolytic polymerization and the like, in the presence of a swollen and compatibilized particulate material. For example, in one such procedure montmorillonite intercalated with protonated 11-aminoundecanoic acid is combined with caprolactam and aminocaproic acid, in a ratio of 4:95:1 by weight. The mixture is stirred at 255° C. for three hours in an inert atmosphere, during which time the caprolactam and amino acid react substantially to yield a polyamide. Platelet particles comprising one or a few layers of montmorillonite are dispersed through the polyamide. The composite of this invention is preferably prepared via a melt blending process in which one or more gamma phase polyamides and one or more compatibilized particulate materials are sheared in the melt at a temperature equal to or greater than the melting point of at least one polyamide in the mixture until the particulate materials exfoliate and disperse to the desired extent. For example, a suitable polyamide such as pellets of nylon 6 and the desired amount of a particulate material such as montmorillionite is heated to a temperature sufficient to form a polyamide melt which is then sheared by some suitable means. In the preferred embodiments of the invention, mechanical shearing methods are employed such as by extruders, injection molding machines, Banbury ® type mixers, Brabender ® type mixers and the like. In the more preferred embodiments of the invention, shearing is achieved by introducing the polymer melt at one end of an extruder (single or double screw) and receiving the sheared polymer at the other end of the extruder. The temperature of the polymer melt, residence time of the melt in the extruder and the design of the extruder (single screw, twin screw, number of flights per unit length, channel depth, flight clearance, mixing zone etc.) are several variables which control the amount of shear to be applied.

The melt of the swellable intercalated material and the polyamide is subjected to shear mixing until the desired amount of material exfoliates to the desired extent. In general, at least about 80% by weight, preferably at least about 85% by weight, more preferably at least about 90% by weight and most preferably at least about 95% by weight of the material delaminate to form fibrils or platelet particles substantially homogeneously dispersed in the polymer matrix.

In either the in-reactor blending process or the melt blending process, useful layered and fibrillar inorganic materials are preferably those which have been swollen and intercalated between layers or fibrils with an organophilic intercalant which weaken the interlayer cohesive energy between layers and fibrils by swelling the interlayer or interfibril distances. In the preferred embodiments of the invention, the intercalant or intercalants increase the compatibility and bonding of the layers or fibrils with the polyamide melt by having attractive interactions with both the surfaces of the fibrils or layers and the polyamide. Intercalants which function to swell interlayer or interfibril distances are hereinafter referred to as "swelling agents", intercalants which function to increase the compatibility and bonding of the layers or fibrils with the polyamide melt are hereinafter referred to as "compatibilizing agents" and intercalants which function as swelling agents and compatibilizing agents are hereinafter referred to as "swelling/compatibilizing agents".

Swellable materials are materials comprising planar layers arrayed in a coherent, coplanar structure or fibrils, where the bonding within the layers or fibrils, is stronger than the bonding between the layers or fibrils such that the materials exhibit increased interlayer or interfibril spacing in their intercalation compounds. The neutral or ionic molecules, called "intercalants", may be introduced into the interlayer or interfibril spaces by either insertion, in the case of neutral molecules, or ion exchange, in the case of ions. The intercalants may be introduced in the form of a solid, liquid, gas, or solute. The intercalants may be introduced into the spaces between every layer or fibril, nearly every layer or fibril, or a large fraction of the layers or fibrils of the material such that the resulting particles comprise less than about 10 layers in thickness or fibrils in diameter. The particles are preferably less than about 8 layers in thickness or about 8 fibrils in diameter, more preferably less than about 5 layers in thickness or about 5 fibrils in diameter, and most preferably, about 1 or 2 layers in thickness or about for or two fibrils in diameter.

Swellable layered or fibril materials, such as the preferred smectite clay materials, generally require treatment by one or more intercalants to provide the required interlayer or interfibril swelling and/or polymer compatibility. The resulting interlayer or fibril spacing is critical to the performance of the intercalated layered material in the practice of this invention. As used herein the "inter-layer or interfibril spacing" refers to the distance between the faces of the layers or the distance between fibrils as they are assembled in the intercalated material before any delamination (or exfoliation) takes place. The preferred clay materials generally include interlayer or exchangeable cations such as $Na^+$, $Ca^{+2}$, $K^+$, $Mg^{+2}$ and the like. In this state, these materials do not delaminate in host polymer melts regardless of mixing, because their interlayer or interfibril spacings are usually equal to or less than about 4 Å consequently the interlayer or interfibril cohesive energy is relatively strong. Moreover, the metal cations do not aid compatibility between layers and fibrils and the polymer melt. In the preferred embodiments, these layered materials are intercalated by swelling agents of sufficient size to increase interlayer or interfibril distances to the desired extent. In general, the interlayer or interfibril distance should be at least about 4 Å, as determined by x-ray diffraction, in order to facilitate delamination of the layered material or fibril material at the nanoscale. In the preferred embodiments of the invention, the interlayer or interfibril distance is at least about 8 Å and more preferred interlayer or interfibril distances are at least about 15 Å. In these preferred embodiments, the swelling agent is a neutral organic molecule or an ionic species which is capable of exchanging with the interlayer or interfibril cations such as $Li^+$, $Na^+$, $K^+$, $Mg^{+2}$, and $Ca^{+2}$ and is of sufficient size to provide the required interlayer or interfibril spacing. Such ionic species include $NH_4^+$, $Al^{+3}$, $Cu^{2+}$, $Fe^{+3}$, $NH_3R^1{}^+$, $NH_2R^1R^2{}^+$, $NHR^1R^2R^3{}^+$, $NR^1R^2R^3R^4{}^+$, where the $R^1$, $R^2$, $R^3$ and $R^4$ are the same or different and are organic substituents, and the like.

In order to further facilitate delamination of layered or fibril materials into platelet particles or fibrils, and prevent reaggregation of the particles, these layers and fibrils are preferably polymer-compatible. In cases where the polymer melt is not compatible with the layers, the swellable layered material or fibril material is intercalated by compatibilizing agents which consist of a portion which bonds to the surface of the layers and another portion which bonds or interacts favorably with the polymer. In some instances, intercalants are used which are swelling/compatibilizing agents which provide both the swelling function and the compatibilization function. Such agents preferably include a moiety or moieties which interact with the surface of the layers displacing, totally or in part, the original metal ions and which bonds to the surface of the layers; and includes a moiety or moieties whose cohesive energies are sufficiently similar to that of the polymer that the surface of the platelets is made more compatible with the polymer, thereby enhancing the homogeneity of the dispersion in the polymeric matrix. As used herein "compatible" refers to the extent to which the polymer matrix and the surface coating on the platelet particles (the compatibilizing agent) have a favorable interaction which promotes the intermingling of the matrix polymer and the surface layer in the interphase region. Compatibility derives from one or more of the following criteria: similar cohesive energy densities for the polymer and the derivatized platelets, similar or complimentary capacities for dispersive, polar, or hydrogen bonding interactions, or other specific interactions, such as acid/base or Lewis-acid/Lewis-base interactions. Compatibilization will lead to an improved dispersion of the platelet particles in the matrix and an improved percentage of delaminated platelets with a thickness of less than 50 Å.

The nature of the swelling/compatibilizing agent, swelling agent/compatibilizing agent will vary widely depending on the particular polymer and the particular layered material. For example, where the swellable layered material is a phyllosilicate as for example a smectite clay and the polyamide is a poly(lactam) such as poly(caprolactam), swelling/compatibilizing agents are preferably zwitterionic and ionic surfactant type molecules, and most preferably neutral organic molecules or zwitterionic and cationic surfactant type molecules. Useful neutral organic molecules include polar molecules such as amides, esters, lactams, nitrilies ureas, carbonates, phosphates, phosphonates, sulfates, sulfonates, nitro compounds, and the like. Preferred neutrals organics are monomus or oligomers of the natrix polymer. Useful cationic surfactants include onium species such as ammonium (primary, secondary, tertiary, and quaternary), phosphonium or sulfonium derivatives of aliphatic, aromatic or arylaliphatic amines, phosphines and sulfides.

Illustrative of such materials are oxonium compounds of the formula:

where $X^+$ is an ammonium, sulfonium or phosphonium radical such as $—NH_3^+$, $—N(CH_3)_3^+$, $—N(CH_3)_2(CH_2CH_3)^+$, $S(CH_3)_3$, $—^+P(CH_3)_3$ $—NH_4^+$ (where $R^5$ is $—(CH)_5{=}$), and the like and $R^5$ is an organic radical as for example substituted or unsubstituted alkyl, cycloalkenyl, cycloalkyl, aryl, or alkylaryl, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsulfinyl, aryloxy, alkylsulfinyl, alkylsulfonyl, arylthio, arylsulfinyl, alkoxycarbonyl, arylsulfonyl, alkylsilane, and a moiety of the formula:

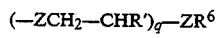

wherein $R^6$ is alkyl, cycloalkyl, aryl, $R'$ is hydrogen, alkyl, or aryl, and Z is $—O—$ or $—NR^7—$, where $R^7$ is hydrogen, alkyl, aryl or alkylsilane. Illustrative of useful $R^5$ groups are hydrogen, alkyl, such as methyl, ethyl, octyl, nonyl, tert-butyl, neopentyl, isopropyl, sec-butyl, dodecyl and the like; alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoylalkyl such as butanoyl octadecyl, pentanoyl nonadecyl, octanoyl pentadecyl, ethanoyl undecyl, propanoyl hexadecyl and the like; amino; alkylaminoalkyl, such as methylamino octadecyl, ethylamino pentadecyl, butylamino nonadecyl and the like; dialkylaminoalkyl, such as dimethylamino octadecyl, methylethylamino nonadecyl and the like; arylaminoalkyl such as phenylamino octadecyl, p-methylphenylamino nonadecyl and the like; diarylaminoalkyl, such as diphenylamino pentadecyl, p-nitrophenyl-p'-methylphenylamino octadecyl and the like; alkylarylaminoalkyl, such as 2-phenyl-4-methylamino pentadecyl and the like; alkylsulfinyl, alkylsulfonyl, alkylthio, arylthio, arylsulfinyl, and arylsulfonyl such as butylthio octadecyl, neopentylthio pentadecyl, methylsulfinyl nonadecyl, benzylsulfinyl pentadecyl, phenylsulfinyl octadecyl, propylthiooctadecyl, octylthio pentadecyl, nonylsulfonyl nonadecyl, octylsulfonyl hexadecyl, methylthio nonadecyl, isopropylthio octadecyl, phenylsulfonyl pentadecyl, methylsulfonyl nonadecyl, nonylthio pentadecyl, phenylthio octadecyl, ethylthio nonadecyl, benzylthio undecyl, phenethylthio pentadecyl, sec-butylthio octadecyl, naphthylthio undecyl and the like; alkoxycarbonylalkyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; aryloryalkyl such as phenoxydecyl, phenoxyoctyl and the like; arylalkyl such as benzyl, phenethyl, 8-phenyloctyl, 10-phenyldecyl and the like; alkylaryl such as 3-decylphenyl, 4-octylphenyl, 4-nonylphenyl and the like; and polypropylene glycol and polyethylene glycol substituents such as ethyl, propyl, butyl, phenyl, benzyl, tolyl, p-styryl, p-phenylmethyl chloride, octyl, dodecyl, octadecyl, methoxy-ethyl, moieties of the formula —$C_3H_6COOH$, —$C_5H_{10}COOH$, —$C_7H_{10}COOH$, —$C_7H_{14}COOH$, —$C_9H_{18}COOH$, —$C_{11}H_{22}COOH$, —$C_{13}H_{26}COOH$, —$C_{15}H_{30}COOH$ and —$C_{17}H_{34}COOH$ and $CH=C(CH_3)COOCH_2CH_2$—, and the like Such ammonium, sulfonium and phosphonium radicals are well known in the art and can be derived from the corresponding amines, phosphines, and sulfides.

Useful swelling/compatibilizing agents also include neutral compounds. For example useful swelling/compatibilizing agents include neutral amine, phosphine, and sulfide forms of the above-referenced oxonium compounds which hydrogen bond to the layers. In this case, the original metal cations are not replaced.

Another class of swelling/compatibilizing agents are those which are covalently bonded to the layers. Illustrative of such groups useful in the practice of this invention are silane coupling agents of the formula:

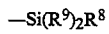

—$Si(R^9)_2R^8$ where $R^9$ is the same or different at each occurrence and is alkyl, alkoxy or oxysilane such as trialkoxysilane compounds as for example octadecyltrimethoxysilane, gamma-aminopropyltriethoxysilane, gamma-aminopropyltrimethoxysilane, gamma-aminopropylphenyldimethoxysilane, gamma-glycidoxypropyl tripropoxysilane, 3,3-epoxycyclohexylethyl trimethoxysilane, gamma-propionamido trithoxysilane, N-trimethoxysilylpropyl-N(beta-aminoethyl) amine, trimethoxysilylundecylamine, trimethoxy silyl-2-chloromethylphenylethane, trimethoxysilyl-ethylphenylsulfonylazide, N-trimethoxysilylpropyl-N,N,N-trimethylammonium chloride, N-(trimethoxysilylpropyl)-N-methyl-N,N-diallylammonium chloride, trimethoxysylilpropyl-cinnamate, 3-mercaptopropyl trimethoxysilane, 3-isocyanatopropyltriethoxysilane, and the like; and $R^8$ is selected from the group consisting of organic radicals which are compatible with the polymer forming the composite.

In other instances, it is convenient to use a compatibilizing agent that is different from the swelling agent. For example, alkylammonium cations may be used to replace the metal cations of a smectite mineral, and be partially replaced, in turn, by a silane coupling agent. In this case, the alkylammonium cation functions as a general purpose swelling agent while the silane can function as a compatibilizing agent that is highly specific to a selected polymer system.

In the preferred embodiments of the invention, the swelling agent, compatibilizing agent and/or swelling-/compatibilizing agent will include a moiety which bonds to the surface of the layered material and will not be reactive with the polymer. Preferably the agent will also include a moiety which does not bond with the layered material and which is compatible with the polymer. In the preferred embodiments of this invention, swelling/compatibilizing agents are employed, especially onium agents and silane agents. In the preferred embodiments of the invention lipophilic swelling and compatibilizing agents are used. Such agents will preferably include a lipophilic portion as for example a long chain alkyl, alkenyl or alkylaryl group (preferably of more than about 9 aliphatic carbon atoms). Such agents are well known in the art and include silane compounds and the ammonium, sulfonium and phosphonium derivatives of octadecylamine, octadecylphosphine, trimethyl dodecyl sulfide, octadecylsulfide, dimethyldidodecyl amine, octadecylamine, dioctylphosphine, methylocladecylamine, dioclysulfide, decylsulfide and the like.

The amount of swelling agent/compatibilizing agent and swelling/compatibilizing agents intercalated into swellable materials useful in this invention may vary substantially provided that the amount is effective to swell and, preferably to compatibilize the layers or fibrils of the intercalated material to the extent required to provide the desired substantially uniform dispersion. In the preferred embodiments of the invention where swelling/compatibilizing agents are employed, amounts of agents employed will preferably range from about 10 mmole/100 g of material to about 1000 mmole/100 g of material. More preferred amounts are from about 20 mmole/100 g to about 200 mmole/100 g. In the case of the preferred smectite clay minerals, the more preferred amounts are from about 80 mmole/100 g to about 120 mmole/100 g of layered material.

Swellable and polymer-compatible intercalated material can be formed by any method. Preferably such materials are formed by intercalation of suitable agent or agents in the interlayer or interfibril spaces of the swellable material by any suitable method. The swelling/compatibilizing agents are introduced into the interlayer or interfibril spaces of the swellable material by any suitable method as, for example, by either insertion of neutral molecules or by ion exchange with ionic molecules, using conventional procedures. Insertion of neutral molecules may be performed by exposing finely divided material to intercalants in the form of a gas, neat liquid, finely divided solid, or solute in a solvent which, preferably swells the material. Insertion is generally aided by exposure of the mixture of intercalant and layered material to shear, heat, ultrasonic cavitation, or microwaves. Ion exchange by ionic molecules may be performed by suspending the material in a relatively volatile liquid which is capable of both exfoliating and dispersing the layers or fibrils and dissolving a salt of the ionic intercalant as well as the resulting salt of the ion displaced from the material (e.g., $Na^+$, $Mg^{+2}$, $Ca^{+2}$), adding the salt of the ionic intercalant, and removing the material (now complexed with the new intercalant) from the liquid (now containing the dissolved salt of the displaced ion). For example, swellable layered minerals such as montmorillonite and hectorite (having primarily $Na^+$ cations in the interlayer spaces) intercalate water to the point that the layers are exfoliated and dispersed uniformly in water. Dispersion in water is generally aided by mixing with relatively high shear. A suitable swelling/compatibilization agent such as the hydrochloride salt of dimethyldodecylamine is then added in the desired amount after which the layers complexed with the ammonium cation are separated from the dispersion, washed of residual NaCl, and dried. In the preferred embodiments of the invention, the swellable layered material is intercalated by ion exchange. For example, a suspension of a montorillonite or a saponite in water, may be heated to about 80° C. and stirred using a high speed homogenizer mixer, in a concentration low enough to yield a low viscosity dispersion from which non-dispersible particles can be separated by sedimentation (mineral concentration of about 2% by weight, or 5% to 15% with addition of a peptizing agent such as sodium hexametaphosphate). The dispersion is combined with a solution of a suitable swelling/compatibilizing agent such as an ammonium salt (as, for example the hydrochlorides of octadecylamine, 11-aminoundecanoic acid dioctylamine, dimethyldodecylamine, methyloctadecylamine, dimethyldidodecylamine, and the like) such that the mole ratio of ammonium salt to exchangeable ions in the mineral is between 0.5 and 5. The amine-complexed layers may be separated from the solution by some suitable method such as filtration or centrifugation, followed by rinsing in fresh water, rough drying, and ball milling to about 100 mesh powder. The powder may be rigorously dried at 100° C. to 160° C. in vacuum for 8 to 24 h in the presence of a drying agent such as phosphorous pentoxide, to provide the desired swellable/polymer compatible intercalated layered material.

Intercalated layered materials intercalated with silanes may be formed by treating a swellable and polymer-compatible intercalated layered material already intercalated with an onium cation with a silane coupling agent in a swelling liquid, such as dioxane, glyme, diglyme, dimethylsulfoxide, methylethylketone, and the like, or by treating an aqueous suspension of a layered material with water-soluble silane coupling agents such as trialkoxysilanes. In the preferred embodiments, silane intercalated swellable/polymer compatible intercalated layered material is formed as follows: Onium-intercalated layered materials, preferably prepared as described above are suspended and swollen in a swelling organic liquid and treated with a trialkoxysilane. For example, montmorillonite intercalated with octadecylammonium cation, at about 80 mmole of ammonium cation/100 g mineral, is combined with dioxane to form a 5% by weight suspension which is heated to 60° C. and combined with a dioxane solution of aminoethylaminopropyl trimethoxysilane, such that the ratio of silane to mineral is about 20 mmole/100 g. The silane displaces the ammonium cation quantitatively to form a mixed intercalated layered material having about 60 mmole of ammonium cation and 20 mmole of silane per 100 g of mineral layers.

In the preferred embodiments of this invention, swellable and polymer-compatible intercalated layered compounds include montmorillonite (Gelwhite HNF, Southern Clay Products) complexed with octdecylammonium cation (100 mmole/100 g mineral), montmorillonite complexed (Volclay, American Colloids Company) with N,N-dimethyloctadecylammonium cation (100 mmole/100 g), synthetic hectorite (Laponite S, Laporte Industries) complexed with dimethyldioctylammonium cation (80 mmole/100 g), commercially available organoclay (Claytone APA$^R$, Southern Clay Products), montmorillonite complexed with octadecylammonium cation (about 80 mmole/g) and derivatized with aminoethylaminopropyltrimethoxysilane (20 mmole/100 g), and the like.

For preferred use in forming nanocomposites, the swelling/compatibilizing agent is selected so that when subjected to the processing temperature of the matrix polymer(s), it does not evolve decompositions products which can cause chain scission or other degradation of the matrix polymers. Special care must be taken when polymers which require high processing temperatures are used. For example, quaternary ammonium cations start to thermally decompose at about 220° to 260° C. into alkenes and amines. On the basis of thermal stability, silanes and onium cations, that cannot undergo beta-elimination are preferred, e.g., ammonium cations of the formula:

where $R^{10}$ is hydrogen or an organic moiety, $R^{11}$ is an organic moiety and $R^{12}$ is the same or different at each occurrence and is an organic radical.

The nanocomposite compositions according to the invention are thermoplastic materials from which molded articles of manufacture having valuable properties can be produced by conventional shaping processes, such as melt spinning, casting, vacuum molding, sheet molding, injection molding and extruding. Examples of such molded articles are components for technical equipment, apparatus castings, household equipment, sports equipment, bottles, containers, components for the electrical and electronics industries, car components, circuits, fibers, semi-finished products which can be shaped by machining and the like. The use of the materials for coating articles by means of powder coating processes is also possible, as is their use as hot-melt adhesives. The molding compositions according to the invention are outstandingly suitable for specific applications of all types since their spectrum of properties can be modified in the desired direction in manifold ways.

The compositions of this invention which include dispersed platelet particles are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness. In the film, the major plane of the platelet fillers is substantially parallel to the major plane of the film. The extent of parallelism of particles and film can be determined by X-ray analysis. X-ray analysis is a useful way to described the crystallinity and orientation of polymer crystals and the orientation of platelet particles. A convenient method of X-ray analysis is that described in X-ray Diffraction Methods in Polymer Science, L. E. Alexander, Wiley, N.Y., pp. 137–229 (1969), hereby incorporated by reference.

For the purpose of the present invention Op, the platelet orientation factor, is an indication of the platelet particle orientation in the film. The Op was determined by making azimuthal scans from densitometer tracings of the X-ray photographs which were obtained by exposing the edge of the film to the incident X-rays. The angle is the angle between the reference direction, the normal to the film, and the normal to the plane of interest, the major plane of the platelet. The Op values were calculated as the average cosine square ($<\cos_2\Phi>$, where $\Phi$ is the angle between platelet normal and the film normal) for the normal to the flat faces of the platelet particles. An Op of 1.0 indicates that the faces of the platelets are completely parallel to the plane of the film. An Op of 0.0 indicates that the faces of the platelets are perpendicular to the plane of the film. The Op of the platelets in the film of the present invention is preferably from about 0.70 to about 1.0, more preferably from about 0.90 to about 1.0 and most preferably from about 0.95 to about 1.0. Such preferred orientation of platelet particles results in enhanced barrier properties and increased tare strength.

The homogeneously distributed platelet particles and polymer are formed into a film by suitable film-forming methods. Typically, the composition is melted and forced through a film forming die. The die can be a flat die or a circular die. A typical flat die is a hanger shaped die, and a typical circular die is a tubular film die.

The film of the nanocomposite of the present invention may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films of this invention may exhibit one or more of the following benefits: increased modulus, wet strength, and dimensional stability, and decreased moisture absorption and permeability to gases such as oxygen and liquids such as water, alcohols and other solvents.

The following examples are presented to more particular illustrate the invention and should not be construed as limitation thereon.

EXAMPLE 1

Dilute nanocomposites of organoclay in nylon 6 were prepared by extruder compounding, and characterized by x-ray diffraction, XRD, of the extrudate and mechanical properties of their injection molded test samples.

The dilute nanocomposites were prepared from a dry mixture of (1) Bentone 34 TM powder (a montmorillonite whose native interlayer cations were ion exchanged for dimethyldioctadecylammonium cation, obtained from Rheox, Inc.) and (2) unfilled nylon 6 pellets (Capron 8209F, obtained from Allied-Signal), by compounding the mixture using a twinscrew extruder equipped with general purpose mixing screws. Prior to compounding, the Bentone 34 powder was vacuum dried at 60° C. to a detectable moisture level of less than about 0.2%, and the nylon pellets were vacuum oven dried at 80° C. to a moisture level of less than about 0.1%. The mixture of Bentone 34 powder and nylon pellets was first compounded into a masterbatch which was determined by its ash content to be about 0.2% by weight inorganic, presumed to be aluminosilicate from the Bentone 34. Portions of this masterbatch were compounded with additional nylon 6 pellets to yield extrudate having calculated mineral concentrations of about 0.1, 0.05, and 0.01% by weight.

After vacuum drying, the final extrudates were analyzed by XRD and found to be, in general, about 65% amorphous, 30% in a gamma crystalline phase, and 5% in an alpha crystalline phase. The various nanocomposites plus an unfilled nylon 6 control were injection molded into test samples using an Arburgh injection molder, and a portion of set of samples was immersed in water for 21 days at a temperature of about 20° C. The flexural and tensile properties of these samples, both dry and wet, were determined according to the procedures of ASTM D790 and ASTM D638, respectively. The notched impact strengths of the dry samples were determined according to the procedures of ASTM D256, and their average values are set forth in Table 3. The flexural and tensile properties are set forth in Tables 1 through 4.

TABLE 1

DRY AS MOLDED FLEXURAL PROPERTIES (ASTM D790)
(injection molded samples)

| nylon: organoclay[a] | crystallinity % alpha/ % gamma | flexural modulus, psi (MPa) | % change in flexural modulus relative to unfilled nylon | flexural strength to 5% strain, psi (MPa) | % change in flexural strength relative to unfilled nylon |
|---|---|---|---|---|---|
| N6: unfilled | 20/8 | 401,000 (2,770) | 0 | 15,700 (108) | 0 |
| :0.01% | <5/30 | 444,000 (3,070) | 11% | 17,300 (120) | 10% |
| :0.05% | <5/30 | 453,000 (3,130) | 13% | 18,000 (124) | 15% |
| :0.10% | <5/30 | 458,000 (3,160) | 14% | 18,000 (124) | 15% |
| N66: unfilled | 20 | 445,000 (3,070) | 0 | 17,100 (118) | 0 |
| :0.01% | 20 | 448,000 (3,100) | 1% | 17,400 (120) | 2% |
| :0.05% | 20 | 451,000 (3,120) | 1% | 17,400 (120) | 2% |
| :0.10% | 20 | 457,000 (3,160) | 3% | 17,400 (120) | 2% |

[a] weight percent clay mineral derived from Bentone 34 (montmorillonite complexed with quaternary ammonium cation)

TABLE 2

WATER-SATURATED FLEXURAL PROPERTIES (ASTM D790)
(injection molded samples immersed 3 weeks in water)

| nylon: organoclay[a] | crystallinity % alpha/ % gamma | flexural modulus, psi (MPa) | % change in flexural modulus relative to unfilled nylon | flexural strength to 5% strain, psi (MPa) | % change in flexural strength relative to unfilled nylon |
|---|---|---|---|---|---|
| N6: unfilled | 36/8 | 60,400 (417) | | 2,550 (18) | |
| :0.01% | 15/30 | 73,400 (507) | 22% | 3,160 (22) | 24% |
| :0.05% | 15/30 | 79,900 (550) | 32% | 3,400 (24) | 33% |
| :0.10% | 17/36 | 79,900 (546) | 31% | 3,400 (24) | 33% |
| N66: unfilled | | 100,200 (690) | | 4,000 (28) | |
| :0.01% | | 98,200 (678) | 0% | 3,900 (27) | 0% |

TABLE 2-continued

WATER-SATURATED FLEXURAL PROPERTIES (ASTM D790)
(injection molded samples immersed 3 weeks in water)

| nylon: organoclay[a] | crystallinity % alpha/ % gamma | flexural modulus, psi (MPa) | % change in flexural modulus relative to unfilled nylon | flexural strength to 5% strain, psi (MPa) | % change in flexural strength relative to unfilled nylon |
|---|---|---|---|---|---|
| :0.05% | | 101,800 (703) | 2% | 4,030 (28) | 1% |
| :0.10% | | 102,000 (705) | 2% | 4,030 (28) | 1% |

[a] weight percent clay mineral derived from Bentone 34 (montmorillonite complexed with quaternary ammonium cation).

TABLE 3

DRY AS MOLDED TENSILE PROPERTIES (ASTM D638)
(injection molded samples)

| nylon: organoclay | tensile yield stress, psi (MPa) | % change in tensile yield stress relative to unfilled nylon | notched impact, ft. lb./inch (J/m) | elongation to break, % |
|---|---|---|---|---|
| N6: unfilled | 11,200 (77) | — | 1.3 (69) | 260% |
| :0.01% | 12,000 (83) | 7% | 1.2 (66) | 150 |
| :0.05% | 12,400 (86) | 11% | 1.2 (64) | 90 |
| :0.10% | 12,300 (85) | 10% | 1.2 (65) | 100 |
| N66: unfilled | 12,200 (84) | — | 1.1 (58) | 20 |
| :0.01% | 12,200 (84) | 0% | 1.0 (54) | 20 |
| :0.05% | 12,200 (84) | 0% | 0.8 (44) | 20 |
| :0.10% | 12,300 (85) | 1% | 0.8 (45) | 20 |

TABLE 4

WATER SATURATED TENSILE PROPERTIES (ASTM D638)
(injection molded samples immersed in water 3 weeks)

| nylon: organoclay | tensile yield stress, psi (MPa) | % change in tensile yield stress relative to unfilled nylon | elongation to break, % |
|---|---|---|---|
| N6: unfilled | 3,100 (21) | — | 300 |
| :0.01% | 3,900 (27) | 26% | 280 |
| :0.05% | 4,200 (29) | 35% | 270 |
| :0.10% | 4,100 (28) | 32% | 270 |
| N66: unfilled | 5,600 (39) | — | 300 |
| :0.01% | 5,600 (39) | 0% | 250 |
| :0.05% | 5,700 (39) | 2% | 250 |
| :0.10% | 5,700 (39) | 2% | 260 |

The strength and stiffness of dry nylon 6 are increased by at least 10% by the addition of dispersed organoclay at concentrations as low as 0.01% by weight (or about 0.005% by volume). At the same time, the toughness of dry nylon 6 (as suggested by the ultimate elongation and notched impact strength) is only slightly reduced by the addition of low concentrations of dispersed organoclay. At high moisture content, the strength and stiffness of nylon 6 are increased by at least 22% by the addition of dispersed organoclay.

Comparative Example 1

Dilute nanocomposites of organoclay (Bentone 34, obtained from Rheox, Inc.) in nylon 66 (Zytel 101, obtained from DuPont) were prepared, injection molded, and characterized according to the procedures described in Example 1, and the results are set forth in Tables 1 through 4. According to their XRD patterns, these nylon 66 nanocomposites exhibited crystallinity that was substantially the same as unfilled nylon 66 which was about 20% in its alpha crystalline phase and which does not form a gamma crystalline phase.

Unlike those of nylon 6, the strength and stiffness of nylon 66 (both dry and water-soaked) were increased by only about 1% to 3% by the addition of dispersed organoclay at concentrations of 0.05% by weight or less. The toughness of dry nylon 66 (as indicated by ultimate elongation and notched impact strength) remained low compared to nylon 6.

EXAMPLE 2

A mixture of organoclay (Claytone APA ™, a montmorillonite complexed with a tetraalkylammonium cation, obtained from Southern Clay Products, Inc.) and nylon 6 (Capron 8209F, obtained from Allied-Signal, Inc.) was extruded and injection molded into test samples whose Drop Weight Impact Strength was determined according to the procedures of ASTM D3029. The mineral content of the extrudate, estimated by its ash content, was about 0.018% by weight. The organoclay and nylon 6 were prepared and extruded according to the procedures described in Example 1. The results of the Drop Weight Impact test, along with those of flexural and tensile tests, are set forth in Table 5.

According to its XRD pattern, the nylon/organoclay composite extrudate was 40% crystalline and rich in gamma-phase crystallites.

TABLE 5

GAMMA-RICH vs ALPHA-RICH NYLON 6:
Flexural, Tensile, and Drop Weight Impact Properties
(dry as molded)

| filler | crystallinity[a] % alpha/% gamma | flexural modulus, Kpsi (MPa) | flexural stress to 5% strain, Kpsi (MPa) | ultimate elongation, % | drop weight impact strength, ft. lb.[b] |
|---|---|---|---|---|---|
| 0.018% | 12/28 | 440 (3,040) | 18 (124) | 83 | 116 |

TABLE 5-continued

GAMMA-RICH vs ALPHA-RICH NYLON 6:
Flexural, Tensile, and Drop Weight Impact Properties
(dry as molded)

| filler | crystallinity[a] % alpha/% gamma | flexural modulus, Kpsi (MPa) | flexural stress to 5% strain, Kpsi (MPa) | ultimate elongation, % | drop weight impact strength, ft. lb.[b] |
|---|---|---|---|---|---|
| clay from Claytone 0.20% talc, Microfine | 22/3 | 440 (3,040) | 17 (117) | 29 | 64 |

[a]Crystallinity of extrudate determined by x-ray diffraction.
[b]ASTM D3029, type A tup.

Comparative Example 2

A mixture of microfine talc (ABT-2500, obtained from Pfizer) and nylon 6 (Capron 8209F) was extruded and injection molded into test samples whose Drop Weight Impact strength was determined according to the procedures of ASTM D3029. The mineral content of the extrudate, estimated by its ash content, was about 0.18% by weight.

EXAMPLE 3

A series of very dilute nylon 6/organoclay nanocomposites was prepared by first compounding Claytone APA with nylon 6 (Capron 8209F) following the procedures described in Example 1 to produce a masterbatch, and then re-extruding portions of the masterbatch with unfilled 8209F nylon 6. The mineral content of the resulting nanocomposites, as calculated based on the ash content of the masterbatch (0.018% by weight), were 0.009%, 0.0036%, and 0.0018% by weight. Injection molded samples of the dilute composites, unfilled 8209F nylon 6, and the talc-nucleated nylon 6 of Comparative Example 2 were characterized by XRD and tested for their mechanical properties according to the procedures of ASTM D790 and for their water uptake during prolonged immersion. The results of these tests are set forth in Table 6.

TABLE 6

| | DILUTE N6/ORGANOCLAY COMPOSITES (ASTM D790) | | | |
|---|---|---|---|---|
| clay content[a], ppm by weight | crystallinity[b] % alpha/% gamma (size & perfection) | flexural modulus, Kpsi (MPa) | flexural stress to 5% strain, Kpsi (MPa) | water uptake, % by weight[c] |
| 0 | 29/11 (64 A) | 401 (2,770) | 15.7 (108) | 8.1 |
| 18 | 0/35 (95 A) | 438 (3,030) | 17.9 (124) | 5.5 |
| 36 | 0/38 (110 A) | 439 (3,030) | 17.8 (123) | 5.4 |
| 90 | 0/35 (100 A) | 439 (3,030) | 17.8 (123) | 5.0 |
| 180 | 0/42 (120 A) | 439 (3,030) | 17.7 (123) | 4.8 |
| 2,000 talc | — | 440 (3,040) | 17.0 (117) | 6.5 |

[a]Mineral content derived from Claytone APA ™.
[b]Crystallinity of ⅛ inch molded samples, based on XRD analysis.
[c]Measured after two weeks of immersion in water at 20° C.

All of the dilute nylon 6/organoclay composites exhibited greater stiffness and strength than unfilled nylon 6 and greater resistance to water absorption than the talc-containing nylon 6 of Comparative Example 2. The molded samples characterized by XRD were found to consist of about 35 to 42% gamma crystalline nylon 6 and less than about 2% of the alpha form. In contrast, a sample of unfilled 8209F nylon 6, molded under the same conditions, was found to have comparable total crystallinity (40%), but with an alpha to gamma ratio of 72 to 28. The size and perfection of the crystallites increased with increasing clay content. The XRD patterns of the 0.0018% composite and the unfilled nylon 6 are shown in FIGS. 1 and 2.

EXAMPLE 4

A nylon 6/organoclay composite having about 0.27% clay mineral was prepared by compounding a mixture of powdered montmorillonite, complexed with protonated 11-aminoundecanoicacid, with nylon 6 pellets (Capron 8207F) according to the procedures described in Example 1.

The organoclay powder was prepared by combining a 4% dispersion of montmorillonite (Gelwhite HNF, obtained from Southern Clay Products) with an aqueous solution of 11-aminoundecanoicacid-HCl (100 mmole/100 g clay) at about 80° C. under high-shear mixing. The flocculated product was filtered, washed 4 times with hot water, dried at 60° C. in vacuum, tumbled in a ball mill, and passed through a 200 mesh screen. Pellets of nylon 6/organoclay composite and also pellets of a commercial gamma-rich nylon 6 (1017K, obtained from Toray) were annealed for 2 hours at various temperatures, and were characterized by their XRD patterns. The crystallinities of the samples after annealing are set forth in Table 7.

TABLE 7

GAMMA CRYSTALLINITY OF A NYLON 6/
ORGANOCLAY NANOCOMPOSITE AFTER
ANNEALING FOR TWO HOURS (determined
by X-Ray Diffraction)

| | PERCENT OF TOTAL CRYSTALLINITY IN GAMMA PHASE[a] | | | |
|---|---|---|---|---|
| sample | before anneal | 195 C | 200 C | 205 C |
| 0.27% clay[a] | 88% | 42% | 40% | 33% |
| Toray 1017K | 65% | 34% | 32% | 13% |

[a]Total crystallinity of each sample was about 50 to 60%.

EXAMPLE 5

Several different organoclays have been used to prepare nylon 6/organoclay nanocomposites following the procedures described in Example 1. These include organoclays derived from montmorillonite, hectorite, and a synthetic lithium-magnesium silicate (Laponite, obtained from LaPorte) treated with alkylammonium cations, organosilanes, and mixtures of onium cations and silanes.

Silane-treated minerals were prepared by combining a water or water/isopropanol solution the silane with a rapidly stirred 4% dispersion of the mineral in a like liquid (water or water/isopropanol). Generally, minerals treated with both silanes and ammoniun cations were prepared by first treating the mineral dispersion with the silane solution (in amounts insufficient to flocculate the mineral), and then the onium hydrochloride. The resulting organoclay was filtered, washed, and dried as described in Example 5. In some cases, minerals treated with both silanes and onium cations were prepared by adding silane to a rapidly stirred dispersion of previously prepared mineral fully complexed with an ammonium cation in refluxing isopropanol.

The crystallinities of these nanocomposites are set forth in Table 8.

flow of nitrogen with constant stirring for 5 h. After cooling, the crude product was milled into 1 mm-sized particles, stirred for 2 h in boiling water 3 times, and dried to a moisture content of less than about 0.1% by weight. Evaluation by XRD, both before and after injection molding, indicated gamma-rich crystallinity.

EXAMPLE 7

An immiscible blend of nylon 6, containing dispersed organoclay, and a rubber modifier exhibits increased flexural strength and modulus, relative to a similar blend containing no organoclay, while retaining its impact strength. The blend is prepared by (1) compounding nylon 6 with montmorillonite complexed protonated dipentyla ammonium cation in a twinscrew extruder such that the composite comprises about 0.2% mineral by weight, and (2) compounding the nylon 6/organoclay composite with a Zn ionomer of poly-(ethylene-co-methacrylic acid) (Surlyn 9910, obtained from DuPont) such that the blend comprises about 20% by weight Surlyn. The resulting blend exhibits predominantly gamma crystallinity in its nylon 6 fraction, while the blend of Surlyn and nylon 6 exhibits predominantly alpha crystallinity in its nylon fraction.

EXAMPLE 8

TABLE 8

CRYSTALLINITY OF NYLON $6^a$ NANOCOMPOSITES OF VARIOUS ORGANOCLAYS

| mineral | treatment[b] | mineral content | % alpha[c] | % gamma | $X_{gamma}$ (XRD) | $X_{gamma}$ (IR)[d] |
|---|---|---|---|---|---|---|
| | control | 0 | 20 | 8 | 0.29 | 0.3 |
| montmorillonite | protonated 11-aminoundecanoic acid | 2.0% | <10 | 31 | 0.76 | 0.6 |
| montmorillonite | protonated octadecylamine | 2.0% | <10 | 32 | 0.76 | 0.6 |
| montmorillonite | protonated dipentylamine | 1.0% | <10 | 28 | 0.74 | |
| montmorillonite | octadecylsilane | 2.0 | <10 | 29 | 0.74 | 0.6 |
| montmorillonite | chloromethylphenylethylsilane | 2.0 | <10 | 29 | 0.74 | |
| montmorillonite | octadecylsilane, chloromethylphenylethylsilane (10:1) | 2.0 | <10 | 28 | 0.74 | 0.5 |
| montmorillonite | protonated dipentylamine, glycidoxypropylsilane (10:1) | 2.0 | <10 | 36 | 0.78 | |
| hectorite | protonated dipentylamine | 0.02 | <10 | 26 | 0.72 | |
| hectorite | protonated dipentylamine, protonated 11-aminoundecanoid acid (10:1) | 0.2 | <10 | 30 | 0.75 | |
| Laponite TM | protonated octadecylamine | 1.0 | 10 | 35 | 0.78 | |
| Laponite TM | protonated 11-aminoundecanoic acid | 1.0 | 8 | 20 | 0.71 | |

[b]According to the weight loss observed when the organoclay were heated to 800° C., the amount of treatment generally corresponded to about 100 mmole/100 g of mineral.
[c]The alpha phase in the nanocomposites was highly disordered an estimated to be not greater than 10%.
[d]The absorbances of IR bands characteristic of alpha (928 cm$^{-1}$) and gamma (977 cm$^{-1}$) were compared with those of samples of known ratios of alpha and gamma nylon 6, following the procedure of Muraki (U.S. Pat. No. 4,290,935)

EXAMPLE 6

Nylon 6 nanocomposites of organoclays were prepared by polymerizing caprolactam in the presence of suspended organophilic layered materials. The resulting nanocomposites, containing about 2% mineral, were found by XRD to comprise 35 to 45% gamma crystalline nylon 6 and less than 10% poorly crystallized alpha phase.

Montmorillonite, derived according to the procedure described in Example 1 and left wet, was rapidly stirred using a high shear mixer (Ross Mixer) with molten caprolactam and aminocaproic acid such that the mixture consisted of about 2.5% derivatized montmorillonite: 10% water: 85% caprolactam: and 2% aminocaproic acid. This mixture was heated to 255° C. under a A dilute composite of nylon 6 and particles of dispersed clay platelets, comprising no onium or organic groups covalently bonded to the clay, exhibits increased strength and rigidity, and predominantly gamma crystallinity. The composite is prepared by (1) mixing, at high shear, montmorillonite intercalated with Na+ cations with molten caprolactam and water in a ratio of about 1:3:1, (2) removing water from a powdered form of the mixture by vacuum drying, (3) compounding the mixture with nylon 6, in an extruder, and (4) leaching the caprolactam from the extrudate with boiling water.

EXAMPLE 9

A composite of nylon 6, organoclay, and glass fiber and all other non-nucleating fillers (nominally ⅛ inch in length), in a ratio of about 84.8:0.2:15 by weight, exhibits higher strength and stiffness relative to a similar composite containing no organoclay. The composite also exhibits predominantly gamma crystallinity in its nylon fraction. The composite is prepared by compounding nylon 6 hectorite complexed with protonated octadecylammonium cation, and then compounding this nanocomposite with glass fiber.

What is claimed is:

1. A composite material comprising a polymer matrix comprising a gamma phase polyamide, wherein at least about 10 weight percent of said polyamide based on the total weight of said polyamide is in the gamma phase, having dispersed therein from greater than zero to less than 0.05% by wgt. of the matrix of an inorganic particulate material selected from the group consisting of layered materials having a thickness equal to or less than about 200 Å and fibrillar silicates having a diameter equal to or less than about 100 Å wherein distances between layers of said layered materials or between fibrils of said fibrillar silicates are at least about 15 Å.

2. A composite according to claim 1 wherein the amount of dispersed inorganic particulate material is equal to or greater than about 10 ppm based on the weight of the polymer matrix.

3. A composite according to claim 2 wherein said amount is equal to or greater than about 20 ppm based on the weight of the polymer matrix.

4. A composite according to claim 3 wherein said amount is equal to or greater than about 100 ppm based on the weight of the polymer matrix.

5. A composite according to claim 1 wherein said dispersed inorganic particulate material is a layered material.

6. A composite according to claim 5 wherein said layered material is a phyllosilicate.

7. A composite according to claim 6 wherein said polymer matrix is polyamides formed by the polymerization of an amino acid or a derivative thereof.

8. A composite according to claim 7 wherein said polyamide is nylon 6 or nylon 12.

9. A composite according to claim 8 wherein said polyamide is nylon 6.

10. A composite according to claim 9 wherein said layered material have an average thickness equal to or less than about 20 Å with a maximum thickness of 60 Å and an average diameter from about 100 to about 5,000 Å with a maximum diameter of 10,000 Å.

11. A composite according to claim 10 wherein said average thickness is equal to or less than about 15 Å and average diameter is from about 200 to about 2000 Å, with a maximum diameter of 5,000 Å.

12. A composite according to claim 11 wherein said average thickness is from about 5 to about 15 Å with a maximum thickness of 25 Å and the average diameter is from about 200 to about 2000 Å, with a maximum diameter of 5,000 Å.

13. A composite according to claim 12 wherein said distance is equal to or greater than about 20 Å.

14. A composite according to claim 13 wherein said distance is equal to or greater than about 30 Å.

15. A composite according to claim 1 wherein said inorganic particulate material is a fibrillar silicate.

16. A composite according to claim 15 wherein said fibrillar silicate is imogolite.

17. A composite according to claim 15 wherein said distance is equal to or greater than about 20 Å.

18. A composite according to claim 17 wherein said distance is equal to or greater than about 30 Å.

* * * * *